United States Patent [19]

Burlett et al.

[11] Patent Number: 5,118,546

[45] Date of Patent: Jun. 2, 1992

[54] BLEND OF POLYCHLOROPRENE AND EPOXIDIZED NATURAL RUBBER

[75] Inventors: Donald J. Burlett, Wadsworth; Richard G. Bauer, Kent, both of Ohio

[73] Assignee: The Goodyear Tire & Rubber Company, Akron, Ohio

[21] Appl. No.: 562,362

[22] Filed: Aug. 3, 1990

[51] Int. Cl.$^5$ ............... B64C 1/00; B29D 22/00; B29D 23/00; B32B 1/08

[52] U.S. Cl. ............... 428/36.8; 152/151; 152/525; 525/215

[58] Field of Search ............... 525/215; 428/36.8; 152/151, 525

[56] References Cited

U.S. PATENT DOCUMENTS

| | | | |
|---|---|---|---|
| 4,621,121 | 11/1986 | Schwarze et al. | 525/329.3 |
| 4,673,741 | 6/1987 | Schwarze et al. | 544/209 |
| 4,674,622 | 6/1987 | Utsunomiya et al. | 198/500 |

OTHER PUBLICATIONS

ACS Rubber Division Preprints; Chicago, Fall 1983, Paper 61, H. J. Barger and L. R. Mayo.
The Neoprenes, R. M. Murray, D. C. Thompson, E. I. DuPont & Company, Wilmington, Delaware 1963.
Encyclopedia of Polymer Science & Engineering, 2nd Edition, Wiley Interscience, New York, New York 1985, vol. 3, pp. 441-462.
A. G. Margaritis, N. K. Kalfoglou, Polymer 28, 497 (1987).
J. K. Kallitsis, N. K. Kalfoglou, Die Angewandte Makromolekulare Chemie, 148, 103 (1987).
A. G. Margaritis, N. K. Kallitsis, N. K. Kalfoglou, Polymer 28, 2122 (1987).
I. A. Katime, M. S. Anasagasti, M. C. Peleteiro, R. Valenciano, Eur. Polym. J., 23 (11) 907 (1987).
M. Bosma, G. Ten Brinke, T. S. Ellis, Polymer Preprints, 29 (1) 212 (1988).

*Primary Examiner*—James J. Seidleck
*Assistant Examiner*—W. R. M. Clark
*Attorney, Agent, or Firm*—Bruce J. Hendricks

[57] ABSTRACT

The present invention relates to an elastomeric composition comprising a blend of from about 25 to about 75 percent by weight of polychloroprene and from about 75 to about 25 percent by weight of epoxidized natural rubber having a level of epoxide modification in the range of from about 15 to 85 mole percent. These blends may be incorporated along with conventional sulfur-vulcanized elastomers to provide new and improved compounded rubbers particularly suited for use in tire tread applications.

5 Claims, No Drawings

BLEND OF POLYCHLOROPRENE AND EPOXIDIZED NATURAL RUBBER

BACKGROUND OF THE INVENTION

A pneumatic tire is a polymeric composite and is a complex system of interacting components, each with specific properties for maximum effectiveness. One of the more important components of a tire is the tread. Since the tread of a tire comes into contact with the road, it is particularly compounded for traction and low rolling resistance. To achieve these various properties, blends of rubbers are conventionally used in the tread rubber. The tread of a passenger tire is generally composed of a blend of styrene butadiene rubber and polybutadiene rubber. The tread for truck and aircraft tires are normally composed of natural rubber or isoprene rubber in blends with other synthetic elastomers such as styrene butadiene rubber, polybutadiene rubber, etc. In order to improve the performance characteristics of tires, tire manufacturers look to the viscoelastic properties of the tread rubber. For low rolling resistance of the tire, a tan. delta optimization at about 60° C. is desired. For good traction, a tan. delta optimization at about 0° C. is desired. Unfortunately, it is difficult to adjust a rubber blend for a tan. delta optimization at both temperature ranges and thus, achieve good rolling resistance and traction. Therefore, there exists a need for a rubber composition which optimizes the tan. delta values for both temperatures.

SUMMARY OF THE INVENTION

The present invention relates to an elastomeric composition which contains a blend of from about 25 to about 75 percent by weight polychloroprene and 75 to 25 percent by weight epoxidized natural rubber The elastomeric composition is particularly suited for use in the tread of a tire.

DETAILED DESCRIPTION OF THE INVENTION

There is disclosed an elastomeric composition comprising a blend of from about 25 to about 75 percent by weight of polychloroprene rubber and from about 75 to about 25 percent by weight of epoxidized natural rubber having a level of epoxidized modification in the range of 15 to 85 mole percent.

There is also disclosed a pneumatic tire having an outer circumferential tread adapted to be ground contacting, where said tread is prepared from a sulfur curable elastomeric composition comprised of, based on 100 parts by weight rubber (phr), (A) from about 60 to about 95 phr of at least one rubber selected from the group consisting of medium vinyl polybutadiene, SBR, synthetic polyisoprene, natural rubber, cis-polybutadiene, styrene-isoprene-butadiene rubber and NBR, and (B) from about 5 to about 40 phr of a blend of (1) from about 75 to about 25 percent by weight of polychloroprene rubber and (2) from about 25 to about 75 percent by weight of epoxidized natural rubber having a level of epoxidized modification in the range of 15 to 85 mole percent.

In accordance with the present invention, the blends will comprise from about 25 to about 75 percent by weight of polychloroprene and from about 75 to about 25 percent by weight of epoxidized natural rubber. Preferably, the blends comprise from about 40 to about 60 percent by weight of polychloroprene and from about 60 to about 40 percent by weight of epoxidized natural rubber. A particularly preferred blend comprises 50 percent by weight of polychloroprene and 50 percent by weight of epoxidized natural rubber.

As known to those skilled in the art, epoxidized natural rubber is a modified form of natural rubber in which some of the unsaturation is replaced by epoxide groups. Epoxidized natural rubber which may be used in the present invention may have a level of epoxide modification ranging from about 15 to 85 mole percent. Preferably, the epoxide level will be in the range of from about 20 to about 30 percent. A particularly preferred epoxide level is 25 percent. Representative of a epoxidized natural rubber which may be used is commercially available from The Malaysian Rubber Producers' Research Association under the designation ENR TM -25.

The second component in the blends of the present invention is a polychloroprene, more commonly known as neoprene. Neoprene is the generic name for polymers of chloroprene (2-chloro-1,3-butadiene). Neoprenes are classified as general purpose or adhesive types. General purpose types are commonly used in a variety of elastomeric applications, particularly molded in extruded goods, hoses, belts, wire and cable, heels and soles, tires, coated fabrics and gaskets. The general purpose types are contemplated for use in the present invention. Representative of the general purpose neoprenes which are contemplated for use in the blends of the present invention are neoprene GN, neoprene GNA, neoprene GRT, neoprene GT, neoprene FB, neoprene W, neoprene WHV, neoprene WRT, neoprene WD, neoprene WB, neoprene WK, neoprene TW, neoprene TW-100, neoprene GW, neoprene W-Ml and neoprene TRT. Preferred polychloroprenes for use in the present invention are commercially available from E I Dupont de Nemours & Company under the designation neoprene GW and neoprene W-Ml.

The vulcanization of the blends of the present invention is dependent upon the presence of a curing agent. As known to those skilled in the art, polychloroprene requires the presence of a metallic oxide. Representative of metallic oxides which may be used include zinc oxide and magnesium oxide or mixtures thereof. Generally speaking, the metallic oxide is present in an amount ranging from about 2 phr to 8 phr (based on the polychloroprene), with a range of from about 3 to 6 phr being preferred. A particularly preferred range includes a mixture of zinc oxide and magnesium oxide.

The blend of polychloroprene and epoxidized rubber is prepared by blending the mixture and masticating the blend at conventional temperatures. For example, the temperature of the composition during mixing may range from about 110° C. to about 170° C. Conventional masticating equipment include Banbury mixers or extruders may be used.

The blend of polychloroprene and epoxidized natural rubber is compounded with conventional rubbers to form new and improved tread stocks. The tread stock is prepared from a sulfur curable elastomeric composition comprised of, based on 100 parts by weight rubber (phr), (A) from about 60 to about 95 phr of at least one rubber selected from the group consisting of medium vinyl polybutadiene, styrene-butadiene rubber, synthetic polyisoprene, natural rubber, cis-polybutadiene, styrene-isoprene-butadiene rubber and NBR: and (B) from about 40 to about 5 phr of a blend of (1) from about 25 to about 75 percent by weight of polychloroprene and (2) from about 75 to about 25 percent by weight of epoxidized natural rubber having a level of epoxidized modification in the range of 15 to 85 mole percent. Preferably, the total amount of the blend of polychloroprene and epoxidized rubber in the rubber stock ranges from about 20 to about 30 phr.

The rubber stock to which the blend is added is conventional to tread rubber. Some representative examples of rubbers that can be used include medium vinyl polybutadiene, styrene-butadiene rubber (SBR), synthetic polyisoprene, natural rubber, styrene-isoprene-butadiene rubber and NBR. Preferred rubbers for use in combination with the blend of the present invention are SBR, cis-polybutadiene, cis-polyisoprene, natural rubber, or mixtures thereof. The most preferred rubbers are styrene/butadiene rubber, cis-polyisoprene, cis-polybutadiene or mixtures thereof. The styrene/butadiene copolymer rubber is conventionally composed of a styrene/butadiene ratio in the range of about 10/90 to about 40/60. Although the copolymer is conventionally prepared by aqueous emulsion copolymerization, for some purposes a styrene/butadiene copolymer rubber prepared by organic solution polymerization is preferred because it typically has a narrower molecular weight range and typically a higher average molecular weight which affect its physical properties. Both emulsion and solution polymerization methods are relatively well known to those having skill in such art.

In addition to the diene rubber, the rubber stock may contain conventional additives including reinforcing agents, fillers, peptizing agent, pigments, stearic acid, accelerators, sulfur vulcanizing agents, antiozonants, antioxidants, processing oils, activators, initiator, plasticizers, waxes, prevulcanization inhibitors, extender oils and the like. Representative of reinforcing agents include carbon black, which is typically added in amounts ranging from about 20 to about 100 phr. Preferably, carbon black is used in amounts ranging from about 45 to about 85 phr. Typical carbon blacks that are used include N-220, N-330, N-347, N-110, N-300, N-550, N-234 and N-339. Representative of conventional accelerators are amines, guanidines, thioureas, thiols, thiurams, sulfenamides, dithiocarbamates and xanthates which are typically added in amounts of from about 0.2 to about 5 phr. Representative of sulfur vulcanizing agents include elemental sulfur (free sulfur) or sulfur donating vulcanizing agents, for example, an amine disulfide, polymeric polysulfide or sulfur olefin adducts. The amount of the sulfur vulcanizing agent will vary depending on the type of rubber and particular type of sulfur vulcanizing agent but generally range from about 0.1 phr to about 5 phr with a range of from about 0.5 phr to about 2 phr being preferred. Representative of the antidegradants which may be in the rubber stock include microcrystalline was, monophenols, bisphenols, thiobisphenols, polyphenols, hydroquinone derivatives, phosphites, phosphate blends, thioesters, napthylamines, diphenylamines as well as other diarylamine derivatives, para-phenylenediamines, quinolines and blended amines. Representative of a peptizing agent that may be used is pentachlorophenol which may be used in an amount ranging from about 0.1 to 0.4 with a range of from about 0.2 to 0.3 being preferred. Antidegradants are generally used in an amount ranging from about 0.10 phr to about 10 phr with a range of from about 4 to 6 phr being preferred. Representative of processing oils which may be used in the rubber stock include activated dithio-bisbenzanilide, poly-para-dinitrosobenzene, xylyl mercaptans, aliphatic-naphthenic aromatic resins, polyethylene glycol, petroleum oils, ester plasticizers, vulcanized vegetable oils, pine tar, phenolic resins, petroleum resins, polymeric esters and rosins. These processing oils may be used in conventional amounts ranging from about 0 to about 10 phr with a range of from about 5 to 10 phr being preferred. Representative of an initiator that may be used is stearic acid. Initiators are generally used in a conventional amount ranging from about 1 to 4 phr with a range of from about 2 to 3 phr being preferred.

Accelerators may be used in conventional amounts. In cases where only primary accelerator is used, the amounts range from about 0.5 to 2.5 phr. In cases where combinations of two or more accelerators are used, the primary accelerator is generally used in amounts ranging from about 0.5 to 2.0 phr and a secondary accelerator is used in amounts ranging from about 0.1 to 0.5 phr. Combinations of accelerators have been known to produce a synergistic effect. Suitable types of conventional accelerators are amines, disulfides, guanidines, thioureas, thiazoles, thiurams, sulfenamides, dithiocarbamates and xanthates. Preferably, the primary accelerator is a sulfenamide. If a secondary accelerator is used, it is preferably a guanidine, dithiocarbamate or thiuram compound.

Pneumatic tires are conventionally comprised of a generally toroidal shaped carcass with an outer circumferential tread adapted to be ground contacting, spaced beads and sidewalls extending radially from and connecting said tread to said beads. The tire can be built, shaped, molded and cured by various methods which will be readily apparent to those having skill in the art.

In the practice of this invention, the polymer blend tread can be integral with and adhered to various tire carcass substrate rubber compositions. Typically, such a rubber composition is at least one of a butadiene/styrene copolymer rubber, cis 1,4-polyisoprene (natural or synthetic rubber) and cis 1,4-polybutadiene. Optionally, such a blend, particularly where the tread is in the region of the sidewall area of the tire may contain one or more of butyl rubber, halobutyl rubber, such as chlorobutyl or bromobutyl rubber, and ethylene/propylene/conjugated diene terpolymer rubber, polyisoprene and polybutadiene rubber.

A rubber composition containing a blend of the present invention may be used to form a tread rubber which can then be applied in the building of a green tire in which the uncured, shaped tread is built onto the carcass following which the green tire is shaped and cured. Alternatively, the tread can be applied to a cured tire carcass from which the previous tread has been buffed or abraded away and the tread cured thereon as a retread.

EXAMPLE 1

Preparation of Polychloroprene/Epoxidized Natural Rubber Blends

A series of blends were prepared in a 250 ml electrically heated Brabender mixer. The epoxidized natural rubber was obtained from The Malaysian Rubber Producers' Research Association under the designation ENR-25. ENR-25 has 25% of its double bonds epoxidized. The polychloroprenes were Neoprene GW and M-1. These materials were obtained from the E. I. Dupont de Nemours & Company of Wilmington, Delaware. The respective amounts of polychloroprene and epoxidized natural rubber were mixed for 5 minutes at 100° C.

A series of rubber compounds containing each polychloroprene/epoxidized natural rubber blend were prepared in a Brabender mixer. For purposes of comparison, the same rubber stock was prepared wherein Neoprene M-1 alone was substituted for the blend (Sample 1), wherein Neoprene GW was substituted for the blend (Sample 2): and wherein polyisoprene was substituted for the blend. In all samples 100 parts of rubber was used. The remaining components in the rubber compounds were:

| Nonproductive | Productive |
|---|---|
| Carbon black | ZnO |
| Oil | MgO |
| Antidegradant | Sulfur |
| Wax | Primary & Secondary Accelerator |
| Initiator | |

Each one of the above compounds were used in conventional amounts as described above.

Table I below lists the data from the various samples which were examined by Rheometer, Instron and Rheovibron.

TABLE II

Comparison of Premixed and In-situ Mixed Neoprene/ENR-25 Blends in Rubber Stocks

| | Premixed | Mixed During Compounding |
|---|---|---|
| Rheometer 150° C. | | |
| Max. | 47.5 | 43.0 |
| Min. | 10.5 | 10.2 |
| Δ Rh | 37.0 | 32.8 |
| t2 | 2.2 | 2.6 |
| t25 | 2.8 | 3.4 |
| t90 | 5.2 | 5.7 |
| Instron | | |
| Mod. (MPa) 50% | 1.65 | 1.66 |
| 300% | — | — |
| Ult. | 14.4 | 19.4 |
| EB (%) | 250 | 295 |
| Rheovibron | | |
| 0° C. log E' | 8.15 | 8.09 |
| log E" | 7.72 | 7.64 |
| tan delta | 0.375 | 0.355 |
| 60° C. log E' | 7.81 | 7.77 |
| log E" | 6.67 | 6.61 |
| tan delta | 0.071 | 0.070 |

The above results indicated that no significant difference occurs using either blending technique.

TABLE I

| | Samples | | | | | | | | | |
|---|---|---|---|---|---|---|---|---|---|---|
| | 1 | 2 | 3 | 4 | 5 | 6 | 7 | 8 | 9 | 10 |
| Neoprene M-1 | — | 100 | — | — | — | — | — | — | — | — |
| Neoprene GW | — | — | 100 | — | — | — | — | — | — | — |
| Polyisoprene | 100 | — | — | — | — | — | — | — | — | — |
| ENR-25 | — | — | — | 100 | — | — | — | — | — | — |
| ENR/M-1 75:25 | — | — | — | — | 100 | — | — | — | — | — |
| ENR/M-1 50:50 | — | — | — | — | — | 100 | — | — | — | — |
| ENR/M-1 25:75 | — | — | — | — | — | — | 100 | — | — | — |
| ENR/GW 75:25 | — | — | — | — | — | — | — | 100 | — | — |
| ENR/GW 50:50 | — | — | — | — | — | — | — | — | 100 | — |
| ENR/GW 25:75 | — | — | — | — | — | — | — | — | — | 100 |
| Rheometer. 150° C. | | | | | | | | | | |
| Δ Torque. dN-m | 28.1 | 30.4 | 42.2 | 29.4 | 34.0 | 33.3 | 29.6 | 32.7 | 28.6 | 31.5 |
| Min. Torque. dN-m | 8.1 | 8.4 | 19.9 | 5.2 | 4.9 | 5.8 | 7.2 | 6.2 | 10.5 | 10.9 |
| t2. min. | 4.9 | 7.4 | 2.4 | 3.8 | 3.9 | 4.6 | 6.3 | 2.6 | 3.1 | 2.8 |
| t25. min. | 5.3 | 9.6 | 5.9 | 4.4 | 4.4 | 5.6 | 7.7 | 3.6 | 3.5 | 3.4 |
| t90. min. | 7.3 | 32.4 | 55.0 | 5.9 | 6.8 | 10.8 | 42.7 | 5.3 | 4.9 | 7.3 |
| Instron Tensile | | | | | | | | | | |
| 50% Mod., MPa | 1.0 | 2.3 | 2.7 | 1.1 | 1.3 | 1.6 | 1.8 | 1.2 | 2.0 | 2.3 |
| 300% Mod., MPa | 8.7 | 20.9 | — | 9.8 | 13.5 | 16.8 | 18.2 | 12.4 | — | — |
| Ult. Tens., MPa | 27.1 | 22.5 | 19.2 | 24.6 | 20.4 | 22.2 | 20.6 | 28.2 | 19.3 | 21.9 |
| Elongation at Break (%) | 590 | 320 | 230 | 550 | 375 | 370 | 330 | 530 | 285 | 285 |
| Rheovibron Tan Δ. | | | | | | | | | | |
| 0° C. | .136 | .216 | .236 | .295 | .327 | .305 | .291 | .345 | .323 | .321 |
| 60° C. | .068 | .125 | .085 | .116 | .105 | .102 | .131 | .100 | .084 | .095 |

As can be seen from the above data, with increasing polychloroprene content, minimum torque, 50% and 300% modulus increased, tan delta torque and ultimate tensile remained steady and elongation at break decreased. Tan delta at 0° C. showed a maximum at 50 weight percent polychloroprene and tan delta at 60° C. showed a minimum at the same level.

EXAMPLE 2

To determine if premixing of the polychloroprene/epoxidized natural rubber was necessary for enhanced properties, both premixed and in-situ mixed rubber compounds were prepared and tested. Each of the rubber compositions contained the same formulation as in Example 1. The properties of each rubber composition is listed in Table II below.

EXAMPLE 3

A series of rubber stocks containing the blend of polychloroprene and epoxidized natural rubber were prepared in a Brabender mixer using two stages of addition. The epoxidized rubber was ENR-25. Other than the blend, the stock was characteristic of a conventional tread stock. The compounds were mixed in a Banbury mixer. The components of the Nonproductive were an oil extended styrene-butadiene rubber (SBR), cis-polybutadiene and a 50/50 by weight blend of the polychloroprene/epoxidized natural rubber (25% epoxidation), carbon black, wax, extending oil, initiator and peptizing agent. The carbon black, wax, initiator and peptizing agent were added in conventional amounts as described above. The second stage reactants were added. The productive reactants included conventional amounts of MgO, antidegradant, zinc oxide, sulfur, primary accelerator and secondary accelerator. In Samples 2-8, MgO was added as a second stage reactant. The rubber compound was compression molded at 150° C. to its t90 value.

Table III below lists the physical properties of the samples which were testing for Rheometer, Instron, Rheovibron, Zwick Rebound, Hot Ring Tensile, Pendulum Skid and Strebler Adhesion.

polyisoprene, a 50/50 by weight blend of the polychloroprene/epoxidized natural rubber (ENR-25), extending oil, carbon black, antidegradant, initiator and wax. The extending oil, carbon black, antidegradant, initiator and wax were used in conventional amounts as described above. Next, the Productive components were added. The Productive reactants included conventional amounts of zinc oxide, sulfur, primary accelerator, and secondary accelerator. In Samples 2-8, MgO was added

TABLE III

|  | 1 | 2 | 3 | 4 | 5 | 6 | 7 | 8 |
| --- | --- | --- | --- | --- | --- | --- | --- | --- |
| Formulation |  |  |  |  |  |  |  |  |
| Nonproductive |  |  |  |  |  |  |  |  |
| SBR[1] | 110 | 110 | 103.1 | 96.3 | 82.5 | 68.8 | 55 | 41.3 |
| Epoxidized natural rubber | — | — | 2.5 | 5 | 10 | 15 | 20 | 25 |
| Neoprene GW | — | — | 2.5 | 5 | 10 | 15 | 20 | 25 |
| Extending oil | 21 | 21 | 22.9 | 24.7 | 28.5 | 32.2 | 36 | 39.7 |
| Cis-polybutadiene | 25 | 25 | 25 | 25 | 25 | 25 | 25 | 25 |
| Productive |  |  |  |  |  |  |  |  |
| MgO | — | 1.5 | 1.5 | 1.5 | 1.5 | 1.5 | 1.5 | 1.5 |
| Rheometer 150° C. |  |  |  |  |  |  |  |  |
| Max. | 31.7 | 26.2 | 26.3 | 27.8 | 35.7 | 31.0 | 34.3 | 36.4 |
| Min. | 9.8 | 9.2 | 9.3 | 9.9 | 12.8 | 10.2 | 10.8 | 11.2 |
| Δ Rh | 21.0 | 17.0 | 17.0 | 17.9 | 22.9 | 20.8 | 23.5 | 25.2 |
| t2 | 5.0 | 6.4 | 5.7 | 5.7 | 4.8 | 4.4 | 4.0 | 4.1 |
| t25 | 6.2 | 7.6 | 6.7 | 6.8 | 5.8 | 5.6 | 5.1 | 5.3 |
| t90 | 16.9 | 16.5 | 13.3 | 13.7 | 10.3 | 10.1 | 9.7 | 10.2 |
| Instron |  |  |  |  |  |  |  |  |
| Mod. (MPa) 50% | 1.08 | 0.93 | 1.00 | 1.13 | 1.49 | 1.49 | 1.56 | 1.67 |
| 100% | 1.76 | 1.36 | 1.63 | 1.77 | 2.35 | 2.54 | 2.75 | 3.01 |
| 300% | 7.76 | 5.89 | 6.64 | 6.94 | 8.64 | 8.98 | 10.05 | 9.85 |
| Ult. | 12.3 | 10.2 | 10.4 | 11.4 | 12.9 | 11.4 | 12.6 | 11.0 |
| EB (%) | 460 | 485 | 450 | 485 | 445 | 385 | 385 | 345 |
| Rheovibron |  |  |  |  |  |  |  |  |
| Tan Delta 0° C. | .186 | .184 | .185 | .198 | .179 | .239 | .254 | .200 |
| 60° C. | .160 | .169 | .160 | .172 | .142 | .166 | .155 | .152 |
| Zwick Rebound |  |  |  |  |  |  |  |  |
| 0° C. | 27.5 | 25.5 | 25.0 | 23.0 | 23.5 | 14.5 | 12.5 | 12.0 |
| Room temperature | 38.5 | 35.0 | 36.0 | 34.0 | 36.5 | 29.0 | 28.5 | 25.5 |
| 100° C. | 58.0 | 52.5 | 51.5 | 52.5 | 59.5 | 55.0 | 57.0 | 53.0 |
| Hot Ring Tensile 200° F. |  |  |  |  |  |  |  |  |
| Mod. 50% | — | — | — | — | — | — | — | — |
| 100% | .63 | .50 | .45 | .85 | 1.55 | 1.20 | 1.25 | 1.65 |
| 300% | 5.4 | 4.8 | 3.8 | 6.1 | 8.6 | 7.4 | 8.3 | — |
| Ultimate tensile | 8.8 | 7.3 | 7.8 | 8.2 | 10.1 | 9.0 | 8.6 | 8.4 |
| Elongation at break (%) | 410 | 385 | 430 | 375 | 340 | 345 | 305 | 275 |
| Pendulum Skid |  |  |  |  |  |  |  |  |
| Wet Asphalt | 59 | 56 | 57 | 57 | 53 | 60 | 60 | 60 |
| Wet Concrete | 60 | 61 | 60 | 63 | 56 | 66 | 65 | 65 |
| Strebler Adhesion |  |  |  |  |  |  |  |  |
| To Self (Newtons/cm) | 79 | 102 | 100 | 89 | 90 | 78 | 65 | 54 |
| Rating | 4 | 4 | 4 | 4 | 4 | 4 | 3.5 | 3 |

[1]Oil extended SBR (16% styrene)

EXAMPLE 4

A series of rubber compounds containing the blend of polychloroprene and epoxidized natural rubber were prepared in a Banbury mixer using two stages of addition. The components of the Nonproductive were cis-polyisoprene, a 50/50 by weight blend of the polychloroprene/epoxidized natural rubber (ENR-25), extending oil, carbon black, antidegradant, initiator and wax. The as a Productive component. The rubber compound was compression molded at 150° C. to its t90 value. Table IV below lists the physical properties of the samples which were testing for Rheometer, Instron, Rheovibron, Zwick Rebound, Hot Ring Tensile, Pendulum Skid and Strebler Adhesion.

TABLE IV

|  | 1 | 2 | 3 | 4 | 5 | 6 | 7 | 8 |
| --- | --- | --- | --- | --- | --- | --- | --- | --- |
| Formulation |  |  |  |  |  |  |  |  |
| Nonproductive |  |  |  |  |  |  |  |  |
| Cis-polyisoprene | 100 | 100 | 95 | 90 | 80 | 70 | 60 | 50 |
| Epoxidized natural rubber | — | — | 2.5 | 5 | 10 | 15 | 20 | 25 |
| Neoprene GW | — | — | 2.5 | 5 | 10 | 15 | 20 | 25 |
| Productive |  |  |  |  |  |  |  |  |
| MgO | — | 3 | 3 | 3 | 3 | 3 | 3 | 3 |
| Rheometer 150° C. |  |  |  |  |  |  |  |  |
| Max. | 42.8 | 40.8 | 41.2 | 40.3 | 41.5 | 42.4 | 42.4 | 43.8 |
| Min. | 12.2 | 12.8 | 13.1 | 13.2 | 12.8 | 13.2 | 13.1 | 13.7 |
| Δ Rh | 30.6 | 28.0 | 28.1 | 27.1 | 28.7 | 29.2 | 29.3 | 30.1 |
| t2 | 2.2 | 2.3 | 2.2 | 2.4 | 2.1 | 2.0 | 1.8 | 1.8 |

TABLE IV-continued

|  | 1 | 2 | 3 | 4 | 5 | 6 | 7 | 8 |
|---|---|---|---|---|---|---|---|---|
| t25 | 3.1 | 3.1 | 2.8 | 3.1 | 2.7 | 2.7 | 2.4 | 2.5 |
| t90 | 6.7 | 5.5 | 5.2 | 5.3 | 5.0 | 4.9 | 4.8 | 4.8 |
| Instron | | | | | | | | |
| Mod. (MPa) 50% | 1.34 | 1.32 | 1.30 | 1.44 | 1.52 | 1.79 | 1.68 | 2.14 |
| 100% | 2.52 | 2.50 | 2.39 | 2.61 | 2.95 | 3.47 | 3.36 | 4.54 |
| 300% | 12.48 | 11.92 | 11.30 | 11.76 | 13.46 | 14.97 | 15.11 | 18.02 |
| Ultimate tensile | 26.4 | 22.2 | 24.1 | 24.4 | 22.1 | 23.8 | 24.2 | 22.9 |
| Elongation at Break (%) | 490 | 460 | 495 | 485 | 425 | 425 | 430 | 355 |
| Rheovibron | | | | | | | | |
| Tan Delta 0° C. | .121 | .120 | .139 | .152 | .194 | .229 | .252 | .269 |
| 60° C. | .101 | .120 | .115 | .110 | .101 | .096 | .094 | .191 |
| Zwick Rebound | | | | | | | | |
| 0° C. | 46.0 | 46.0 | 40.0 | 36.5 | 25.0 | 31.0 | 19.0 | 17.0 |
| Room temperature | 58.5 | 58.0 | 52.0 | 49.0 | 43.5 | 41.5 | 41.5 | 41.5 |
| 100° C. | 71.5 | 70.0 | 68.0 | 67.5 | 68.0 | 68.5 | 69.0 | 71.0 |
| Hot Ring Tensile 200° F. | | | | | | | | |
| Mod. 50% | .38 | .35 | .50 | .50 | .35 | .63 | .45 | .65 |
| 100% | 1.20 | 1.30 | 1.40 | 1.50 | 1.50 | 1.80 | 1.65 | 1.80 |
| 300% | 5.88 | 5.65 | 6.25 | 6.00 | 6.90 | 8.15 | 8.40 | 9.80 |
| Ultimate tensile | 17.2 | 16.5 | 17.3 | 16.0 | 16.4 | 13.6 | 14.2 | 12.9 |
| Elongation at break (%) | 620 | 625 | 610 | 600 | 560 | 455 | 455 | 375 |
| Pendulum Skid | | | | | | | | |
| Wet Asphalt | 52 | 54 | 54 | 55 | 55 | 56 | 56 | 59 |
| Wet Concrete | 60 | 60 | 61 | 60 | 59 | 62 | 63 | 65 |
| Strebler Adhesion | | | | | | | | |
| To Self (Newtons/cm) | 96 | 90 | 100 | 97 | 85 | 79 | 46 | 50 |
| Rating | 4.5 | 4 | 4 | 4 | 4 | 3.5 | 3 | 3.5 |

What is claimed is:

1. A pneumatic tire having an outer circumferential tread adapted to be ground contacting, where said tread is a sulfur cured product of an elastomeric composition comprised of, based on 100 parts of weight of rubber (phr). (A) about 60 to about 95 phr of at least one rubber selected from the group consisting of medium vinyl polybutadiene, styrene-butadiene rubber, synthetic polyisoprene, natural rubber, cis-polybutadiene, styrene-isoprene-butadiene rubber and NBR; and (B) from about 5 to about 40 phr of a blend having (1) from about 75 to about 25 percent by weight of polychloroprene and (2) from about 25 to about 75 percent by weight of epoxidized natural rubber having a level of epoxidized modification in the range of 15 to 85 mole percent.

2. The tire of claim 1 wherein said rubber in said tread is selected from the group consisting of styrene-butadiene rubber, cis-polybutadiene, cis-polyisoprene or mixtures thereof.

3. The tire of claim 1 wherein said tread comprises from about 70 to about 80 phr of said rubber and from about 30 to about 20 phr of said blend.

4. The tire of claim 1 wherein the blend comprises from about 40 to about 60 percent by weight of polychloroprene and from about 60 to about 40 percent by weight of expoxidized natural rubber.

5. The tire of claim 1 wherein the level of epoxidized modification of the epoxidized natural rubber ranges from about 20 to about 30 mole percent.

* * * * *